July 22, 1958
C. C. McKISSICK
2,844,806
BATTERY POST SEALER
Filed May 25, 1956
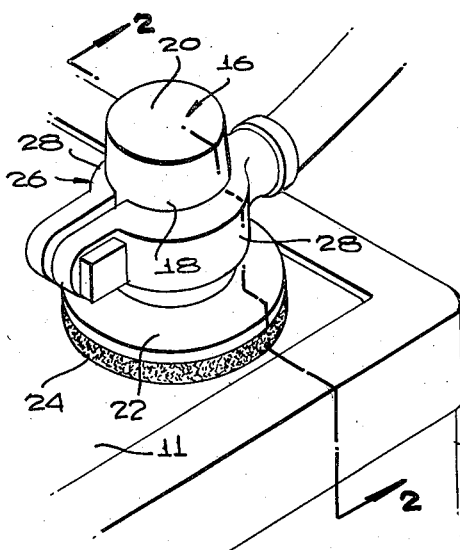
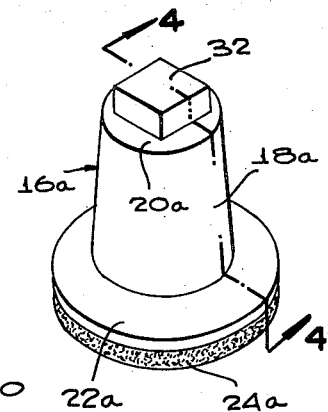
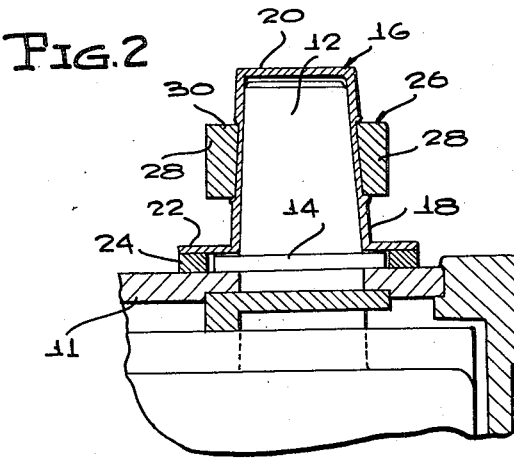
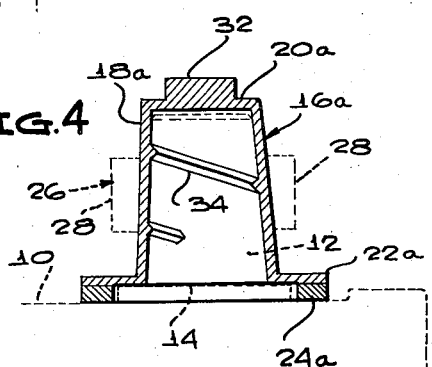
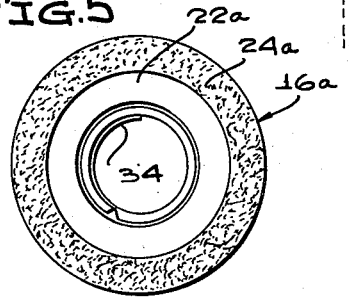
INVENTOR.
CHARLES C. McKISSICK
BY
McMorrow, Berman + Davidson
ATTORNEYS

United States Patent Office 2,844,806
Patented July 22, 1958

2,844,806

BATTERY POST SEALER

Charles C. McKissick, El Cerrito, Calif.

Application May 25, 1956, Serial No. 587,288

4 Claims. (Cl. 339—116)

This invention relates to a device applicable to the post of a battery, to provide a seal about said post that will prevent, to the maximum extent, corrosion of the post resulting from acid vapor flowing upwardly about the post.

Acid fumes tend to rise about a battery post, causing corrosion which in turn destroys or reduces considerably a good electrical connection between the post and a battery clamp.

Further, battery posts tend to become loose or damaged. This also results in a poor connection at the terminal of the battery, and the loosening of the post is often hastened by the tendency of many repairmen to hammer or drive the post downwardly. This in many instances breaks the seal at the base of the post and even causes the cell cover to be broken.

The main object of the invention, in view of the above, is to provide a battery post sealing device that will be readily applicable to a post, and will provide a sealing means extending fully about the base of the post, that will prevent corrosion.

Another object is to so design the sealing device that the battery post will be rigidly held in place, even if said post has previously been loosened.

Still another object is to provide a device of the character described that can be applicable to the post with minimum difficulty, will fit any of various conventionally designed posts, will insure a good electrical connection at all times, and will be capable of manufacture at low cost.

Another object, in one form of the invention, is to provide a self-threading device that will form complementary thread grooves in the surface of the battery post, in a manner that will not only insure a tight, sealed connection of the sealing device to the post, but will also serve to elevate the post to bind it tightly against the battery cover.

Still another object, in another form, is to facilitate application of the device without the use of thread means, with the device being frictionally bound against the post by being lightly tapped into place.

Summarized briefly, the invention comprises a cover of electrically conductive material having an inverted cup shape to permit the same to fit over the battery post. At the base of the cover there is an outwardly directed, circumferential flange, and to the underside of the flange there is secured an annular gasket of a compressible, corrosion-resistant material, which gasket binds tightly against the cover of the battery in the area surrounding the base of the battery post.

In a modified form, internal threads are provided upon the device, having a self-tapping action that will cause the threads to form complementary thread grooves on the battery post.

Other objects will appear from the following description, the claims appended thereto, and from the annexed drawing, in which like reference characters designate like parts throughout the several views, and wherein:

Figure 1 is a perspective view of the battery post cover in place upon a battery post, a conventional clamp being applied to the covering device, the battery housing or cover being illustrated fragmentarily;

Figure 2 is a section on line 2—2 of Figure 1;

Figure 3 is a perspective view of a modified battery post cover;

Figure 4 is a section on line 4—4 of Figure 3, the terminal clamp, battery post, and battery housing being illustrated in dotted lines; and Figure 5 is a bottom plan view of the modified device shown in Figure 3.

Referring to the drawings in detail, the reference numeral 10 designates a conventional battery housing, including a top wall 11. Extending upwardly from the top wall is a conventional battery post 12 tapering slightly toward its upper end and formed at its lower end with a circumferentially extending base flange 14 bearing against top wall 11.

The sealing device constituting the invention has been generally designated at 16, and includes a hollow body portion 18 of inverted cup shape, tapering toward its upper end and adapted to snugly receive the battery post 12. Body portion 18 is of any suitable electrically conductive material, and is completely closed at its upper end by a flat top wall 20.

At its lower end, the body portion is integral with a flat, outwardly directed flange 22 substantially greater in outer diameter than the outer diameter of base flange 14 of battery post 12. As a result, the marginal portion of flange 22 extends outwardly beyond the outer periphery of base flange 14.

Adhesively or otherwise secured to the marginal portion of flange 22 is an annular, relatively thick gasket 24. This is formed of a compressible material resistant to the corrosive effects of acid fumes. For example, the gasket may be felt or wool, treated with a mixture of oil and soda.

The thickness of the gasket 24 is greater than that of base flange 14. Therefore, when the battery post sealing device is applied to the battery post, and is tapped lightly into place, the gasket binds tightly against the upper surface of the top wall 11 of the battery housing. The inner periphery of flange 22 as shown in Figure 2 will overlie the base flange 14 of the battery post, so that the flange 14 will be tightly engaged between the top wall 11 of the battery and the flange 22 of the sealing device. Further, the inner surface of the cup-shaped body portion 18 will be in tight, sealing engagement with the side surface of the battery post over the full area of said side surface.

The result will be that a seal is provided by gasket 24 and by the side wall of the battery post cover, effectively preventing acid fumes or vapor from impinging against the battery post surface. Further, through the provision of the gasket said vapor will be prevented from passage beyond the gasket, and therefore will be unable to impinge against the outer surface of the sealing device.

After the sealing device has been applied, a conventional battery terminal clamp 26 can be positioned thereabout. This includes the usual arcuate clamping arms 28, which when drawn toward each other are forced into the material of the sealing device as at 30 (Figure 2).

The device serves not only in preventing corrosion or coating of the battery post and the sealing device, but also serves in preventing the battery post from becoming loosened. Alternatively, if the post has been previously loosened, the sealing device will hold it tightly against movement relative to the battery housing and other components of the battery.

In Figures 3–5 there is shown a modified sealing device 16a including a body portion 18a similar to body portion 18 in shape. On the flat top wall 20a of the body portion there is integrally formed an upwardly extending projection or lug 32 of non-circular configuration adapted to receive a wrench or like tool.

At its base, body portion 18a is integral with an outwardly directed flange 22a, to the underside of which is secured a compressible gasket 24a.

Formed upon the inner surface of the side wall of the body portion are coarse threads 34, and accordingly by positioning the device upon the battery post, and by rotating the same with downward pressure being exerted during the rotational movement, the threads 34 will cut into the material of the body portion 12, forming complementary thread grooves. The device thus threads itself onto the battery post, and by continued rotation of the device after the gasket 24a has engaged the top wall of the battery and has compressed, the battery post will be lifted if it has previously been loosened, so as to cause the same to be tightly bound against the underside of the top wall 11.

The clamp 26 is then applied in the same manner as shown in Figure 1.

It will be seen that the device can be used on batteries of conventional design, and can be employed to advantage to prevent corrosion and looseness, even if a battery post has previously been loosened. Further, the device can be incorporated in a new battery, with the upper end wall 20 or 20a being left off and the battery post cast into the body portion 18a. In other words, the body portion 18a and battery post would in effect be melted together, providing a permanent seal with a broad bottom flange tending to prevent the battery post from being driven down into the cell.

Further, if a battery manufacturer desires to use the sealing device as a built-in unit, the device could be threaded to be fitted onto the post, to serve as a post support nut.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A corrosion-resistant terminal structure for batteries comprising, in combination with a battery housing including a flat top wall, and with a battery post extending upwardly from said top wall and formed at its lower end with a circumferentially extending base flange bearing against the top wall: a sealing device comprising a hollow body portion of inverted cup shape wholly closed at its upper end and including a side wall sealably contacting the surface of the battery post over the full length of the portion of the battery post that extends from the base flange to the upper extremity thereof, said body portion being of electrically conductive material; a wholly planiform, outwardly directed, circumferential flange integrally formed upon the lower end of the body portion and extending about the body portion in a plane perpendicular to the length of the body portion, said flange being substantially greater in outer diameter than the outer diameter of the base flange, defining a marginal portion on the last named flange extending outwardly beyond the outer periphery of the base flange, said second named flange being in face-to-face, sealing contact at the underside thereof with the upper surface of the base flange; and a gasket compressible at least in a direction longitudinally of the body portion and formed, in its uncompressed condition, to a thickness greater than that of the base flange, said gasket being of annular formation and extending continuously about the full circumference of the flange, the gasket having a top surface secured to the underside of said marginal portion of the second named flange, the inner diameter of the gasket being slightly greater than the outer diameter of the base flange, said gasket being held under compression between said top wall of the battery housing and the marginal portion of the second named flange and being compressed to a thickness matching that of the base flange.

2. A corrosion-resistant terminal structure for batteries comprising, in combination with a battery housing including a flat top wall, and with a battery post extending upwardly from said top wall and formed at its lower end with a circumferentially extending base flange bearing against the top wall: a sealing device comprising a hollow body portion of inverted cup shape wholly closed at its upper end and including a side wall sealably contacting the surface of the battery post over the full length of the portion of the battery post that extends from the base flange to the upper extremity thereof, said body portion being of electrically conductive material; a wholly planiform, outwardly directed, circumferential flange integrally formed upon the lower end of the body portion and extending about the body portion in a plane perpendicular to the length of the body portion, said flange being substantially greater in outer diameter than the outer diameter of the base flange, defining a marginal portion on the last named flange extending outwardly beyond the outer periphery of the base flange, said second named flange being in face-to-face, sealing contact at the underside thereof with the upper surface of the base flange; and a gasket compressible at least in a direction longitudinally of the body portion and formed, in its uncompressed condition, to a thickness greater than that of the base flange, said gasket being of annular formation and extending continuously about the full circumference of the flange, the gasket having a top surface secured to the underside of said marginal portion of the second named flange, the inner diameter of the gasket being slightly greater than the outer diameter of the base flange, said gasket being held under compression between said top wall of the battery housing and the marginal portion of the second named flange and being compressed to a thickness matching that of the base flange, said body portion being formed with internal threads of the self-tapping type, for cutting threads in the battery post in the application of the body portion to said battery post.

3. A corrosion-resistant terminal structure for batteries comprising, in combination with a battery housing including a flat top wall, and with a battery post extending upwardly from said top wall and formed at its lower end with a circumferentially extending base flange bearing against the top wall: a sealing device comprising a hollow body portion of inverted cup shape wholly closed at its upper end and including a side wall sealably contacting the surface of the battery post over the full length of the portion of the battery post that extends from the base flange to the upper extremity thereof, said body portion being of electrically conductive material; a wholly planiform, outwardly directed, circumferential flange integrally formed upon the lower end of the body portion and extending about the body portion in a plane perpendicular to the length of the body portion, said flange being substantially greater in outer diameter than the outer diameter of the base flange, defining a marginal portion on the last named flange extending outwardly beyond the outer periphery of the base flange, said second named flange being in face-to-face, sealing contact at the underside thereof with the upper surface of the base flange; and a gasket compressible at least in a direction longitudinally of the body portion and formed, in its uncompressed condition, to a thickness greater than that of the base flange, said gasket being of annular formation and extending continuously about the full circumference of the flange, the gasket having a top surface secured to the underside of said marginal portion of the second named flange, the inner diameter of the gasket being slightly greater than the outer diameter of the base flange, said gasket being held under compression between said top wall of the battery housing and the marginal portion of the second named flange and being compressed to a thickness matching that of the base flange, said side wall being of a ductile material adapted for forcing of the arms of a terminal clamp into the same to cause said side wall to tightly grip the battery post under the pressure of said clamp arms, whereby to hold the body portion against slippage longitudinally of the battery post from a position in which the side wall is in sealing contact with the surface of the battery post, the second named flange is in sealing contact with the base flange, and the gasket is compressed to the thickness of the base flange.

4. A corrosion-resistant terminal structure for batteries comprising, in combination with a battery housing including a flat top wall, and with a battery post extending upwardly from said top wall and formed at its lower end with a circumferentially extending base flange bearing against the top wall: a sealing device comprising a hollow body portion of inverted cup shape wholly closed at its upper end and including a side wall sealably contacting the surface of the battery post over the full length of the portion of the battery post that extends from the base flange to the upper extremity thereof, said body portion being of electrically conductive material; a wholly planiform, outwardly directed, circumferential flange integrally formed upon the lower end of the body portion and extending about the body portion in a plane perpendicular to the length of the body portion, said flange being substantially greater in outer diameter than the outer diameter of the base flange, defining a marginal portion on the last named flange extending outwardly beyond the outer periphery of the base flange, said second named flange being in face-to-face, sealing contact at the underside thereof with the upper surface of the base flange; and a gasket compressible at least in a direction longitudinally of the body portion and formed, in its uncompressed condition, to a thickness greater than that of the base flange, said gasket being of annular formation and extending continuously about the full circumference of the flange, the gasket having a top surface secured to the underside of said marginal portion of the second named flange, the inner diameter of the gasket being slightly greater than the outer diameter of the base flange, said gasket being held under compression between said top wall of the battery housing and the marginal portion of the second named flange and being compressed to a thickness matching that of the base flange, said body portion being formed with internal threads of the self-tapping type, for cutting threads in the battery post in the application of the body portion to said battery post, said internal threads of the body portion comprising a spiralling, thread-forming rib projecting inwardly from the inner surface of said side wall, the width of the rib being appreciably less than the distance between adjacent convolutions of the spiral, the inner surface of said side wall of the body portion being otherwise wholly smooth and free of projections.

References Cited in the file of this patent

UNITED STATES PATENTS

| 1,678,733 | Kromann | July 31, 1928 |
| 2,027,262 | Allen | Jan. 7, 1936 |
| 2,073,118 | Peirson | Mar. 9, 1937 |

FOREIGN PATENTS

| 25,475/35 | Australia | Nov. 29, 1935 |